United States Patent
Martin et al.

(10) Patent No.: US 9,749,007 B1
(45) Date of Patent: Aug. 29, 2017

(54) COGNITIVE BLIND SOURCE SEPARATOR

(71) Applicant: HRL Laboratories, LLC, Malibu, CA (US)

(72) Inventors: Charles E Martin, Thousand Oaks, CA (US); Shankar R. Rao, Agoura Hills, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/073,626

(22) Filed: Mar. 17, 2016

Related U.S. Application Data
(60) Provisional application No. 62/135,539, filed on Mar. 19, 2015.

(51) Int. Cl.
*H04B 1/00* (2006.01)
*H04B 1/719* (2011.01)
*H04B 1/7163* (2011.01)

(52) U.S. Cl.
CPC ......... *H04B 1/719* (2013.01); *H04B 1/71632* (2013.01)

(58) Field of Classification Search
CPC ............................ H04B 1/719; H04B 1/71632
USPC ...................... 375/130, 346; 342/377; 381/66
See application file for complete search history.

(56) References Cited

U.S. PATENT DOCUMENTS

| | | | | | |
|---|---|---|---|---|---|
| 5,694,474 | A | * | 12/1997 | Ngo ..................... | G06K 9/0057 381/66 |
| 8,031,117 | B2 | * | 10/2011 | Goldberg ............. | H04B 7/0854 342/377 |
| 9,042,496 | B1 | * | 5/2015 | Su ....................... | H04L 27/0012 375/346 |
| 2005/0267377 | A1 | * | 12/2005 | Marossero ......... | A61B 5/02411 600/511 |
| 2012/0232418 | A1 | * | 9/2012 | Kimura .............. | A61B 5/02411 600/528 |

OTHER PUBLICATIONS

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

(Continued)

*Primary Examiner* — Daniel Washburn
*Assistant Examiner* — Fitwi Hailegiorgis
(74) *Attorney, Agent, or Firm* — Tope-McKay & Associates

(57) ABSTRACT

Described is a cognitive blind source separator (CBSS). The CBSS includes a delay embedding module that receives a mixture signal (the mixture signal being a time-series of data points from one or more mixtures of source signals) and time-lags the signal to generate a delay embedded mixture signal. The delay embedded mixture signal is then linearly mapped into a reservoir to create a high-dimensional state-space representation of the mixture signal. The state-space representations are then linearly mapped to one or more output nodes in an output layer to generate pre-filtered signals. The pre-filtered signals are passed through a bank of adaptable finite impulse response (FIR) filters to generate separate source signals that collectively formed the mixture signal.

20 Claims, 9 Drawing Sheets

(56) References Cited

OTHER PUBLICATIONS

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
A. Hyvarinen, "Complexity Pursuit: Separating Interesting Components from Time Series," Neural Computation, vol. 13, No. 4, pp. 883-898, Apr. 2001.
Igel, C. and Husken, M., "Improving the Rprop learning algorithm", in Proc. of the 2nd Int. Symposium on Neural Computation (NC'2000), pp. 115-121, ICSC Academic Press, 2000.
R. H. Walden, "Analog-to-digital converter survey and analysis," IEEE J. Sel. Areas Commun., vol. 51, pp. 539-548, 1999.

\* cited by examiner

COGNITIVE BLIND SOURCE SEPARATOR

GOVERNMENT RIGHTS

This invention was made with government support under U.S. Government ONR Contract: N00014-12-C-0027. The government has certain rights in the invention.

CROSS-REFERENCE TO RELATED APPLICATIONS

This is a non-provisional patent application of 62/135,539, filed on Mar. 19, 2015, the entirety of which is hereby incorporated by reference.

BACKGROUND OF INVENTION (1) Field of Invention

The present invention is related to a blind source separator and, more particularly, to a cognitive blind source separator that is operable for separating multiple temporally correlated source radio-frequency (RF) signals over an ultra-wide bandwidth (e.g., >30 gigahertz (Ghz)).

(2) Description of Related Art

Blind signal separation, also known as blind source separation, is the separation of a set of source signals from a set of mixed signals (mixture signals), without the aid of information (or with very little information) about the source signals or the mixing process. Thus, in the Blind Source Separation (BSS) problem, any single antenna measures multiple source signals. There may be more than one antenna measuring the signals, but in general each antenna "sees" all of the source signals and creates a different linear mixture of them. The task is then to use the measured mixture signals in order to recover the original source signals. The case of a single antenna operating in isolation is especially challenging because there is no sense of spatial resolution to aid in the extraction process.

Conventional methods for BSS typically require a greater number of input mixtures (which maps directly to a greater number of antenna) than the number of source signals, limiting their applicability in size-, weight-, and power (SWaP)-constrained scenarios (see, for example, the List of Incorporated Literature References, Literature Reference No. 1). Some extensions to conventional BSS have addressed the "underdetermined" scenario (with fewer mixtures than sources) that leverage prior knowledge about the sources, such as having "low complexity" or having a sparse representation with respect to a learned dictionary. Such models of prior knowledge are too broad, enabling the system to over fit an entire mixture as a single source, and require large amounts of memory to store the dictionary and computation to recover the presentation of the input mixtures with respect to the dictionary (see, for example, Literature Reference Nos. 1 and 3). In other work, the researchers coupled the BSS algorithm with an infinite impulse response (IIR) bandpass filter with tunable center frequency in order to separate temporally correlated sources (see Literature Reference No. 2). This work was still quite limited, requiring at least as many mixtures as sources, requiring that the mixtures be "prewhitened" to have an identity-valued covariance matrix, and using the second-order statistics of sources as the sole cue for separation.

It should be noted that such source signals are often transmitted as radio-frequency (RF) signals over an ultra-wide bandwidth. State-of-the-art systems for detecting, localizing, and classifying source emitters from passive RF antennas over an ultra-wide bandwidth (>30 gigahertz (Ghz)) require high rate analog-to-digital converters (ADC). Such high-rate ADCs are expensive and power hungry, and due to fundamental physical limits (such as the Walden curve as described in Literature Reference No. 5), are not capable of achieving the sampling rate needed to capture the ultra-wide bandwidth. To mitigate this, service oriented architecture (SOA) electronic support measure (ESM) systems use either spectrum sweeping (which is too slow to handle agile emitters) or a suite of digital channelizers, which have large size, weight, and power requirements. In addition, the detection, localization, and classification algorithm that SOA ESM systems use are typically based on the fast Fourier transform, with high computational complexity and memory requirements that make it difficult to operate in real-time over an ultra-wide bandwidth.

Thus, a continuing need exists for a blind source separator that is operable for separating multiple temporally correlated source RF signals over an ultra-wide bandwidth (e.g., >30 Ghz) using as little as a single antenna.

SUMMARY OF INVENTION

This disclosure provides a cognitive blind source separator (CBSS). In some embodiments, the CBBS includes one or more processors and a memory. The memory is, for example, a non-transitory computer-readable medium having executable instructions encoded thereon, such that upon execution of the instructions, the one or more processors perform several operations. The CBSS includes a delay embedding module that receives a mixture signal (the mixture signal being a time-series of data points from one or more mixtures of source signals) and time-lags the signal to generate a delay embedded mixture signal (based on the mixture signal). The delay embedded mixture signal is then linearly mapped into a reservoir to create a high-dimensional state-space representation of the mixture signal; in various embodiments, the high-dimensional state-space representation of the mixture signal is created by combining the delay embedded mixture signal with reservoir states. The state-space representations are then linearly mapped to one or more output nodes in an output layer to generate pre-filtered signals. The pre-filtered signals are passed through a bank of adaptable finite impulse response (FIR) filters to identify at least one of the separate source signals that collectively form the mixture signal; thus, in various embodiments, the system identifies at least one of the separate source signals that collectively form the mixture signal based on the high-dimensional state-space representation of the mixture signal.

In yet another aspect, the CBBS performs an operation of linearly mapping the state-space representations to one or more output nodes in an output layer to generate pre-filtered signals.

Additionally, at least one of the separate source signals is identified by adaptively filtering the pre-filtered signals.

Further, in adaptively filtering, the pre-filtered signals are passed through a bank of adaptable finite impulse response (FIR) filters.

In yet another aspect, each pre-filtered signal is fed into a unique filter in the bank of adaptable FIR filters, with each unique filter having an adaptable center frequency.

Further, the output layer comprises a set of summing nodes, each summing node receiving a weighted output from each reservoir node as input, and summing these values together to produce its output.

In yet another aspect, each node in the output layer has a unique and adaptable set of output weights on its input connections, such that as one or more mixture signals are passed into the CBSS, these the output weights are adapted so that output from a given node amplifies a subset of the source signals while suppressing others.

In another aspect, the CBBS performs an operation of deriving an error signal, with the error signal being used to update the center frequencies of the filters in the bank of adaptable FIR filters and update the output weights in the output layer.

Additionally, each output node in the output layer of the reservoir is associated with a unique FIR filter and the pre-filtered signals are passed through their respective FIR filter.

In another aspect, the CBBS performs an operation of extracting features from at least one of the separate source signals.

In yet another aspect, the reservoir is a recurrent neural network with a plurality of nodes.

Finally and as noted above, the present invention also includes a computer program product and a method. The computer program product includes computer-readable instructions stored on a non-transitory computer-readable medium that are executable by a computer having one or more processors, such that upon execution of the instructions, the one or more processors perform the operations listed herein. Alternatively, the method includes an act of causing a computer to execute such instructions and perform the resulting operations.

DETAILED DESCRIPTION

Figure 1:
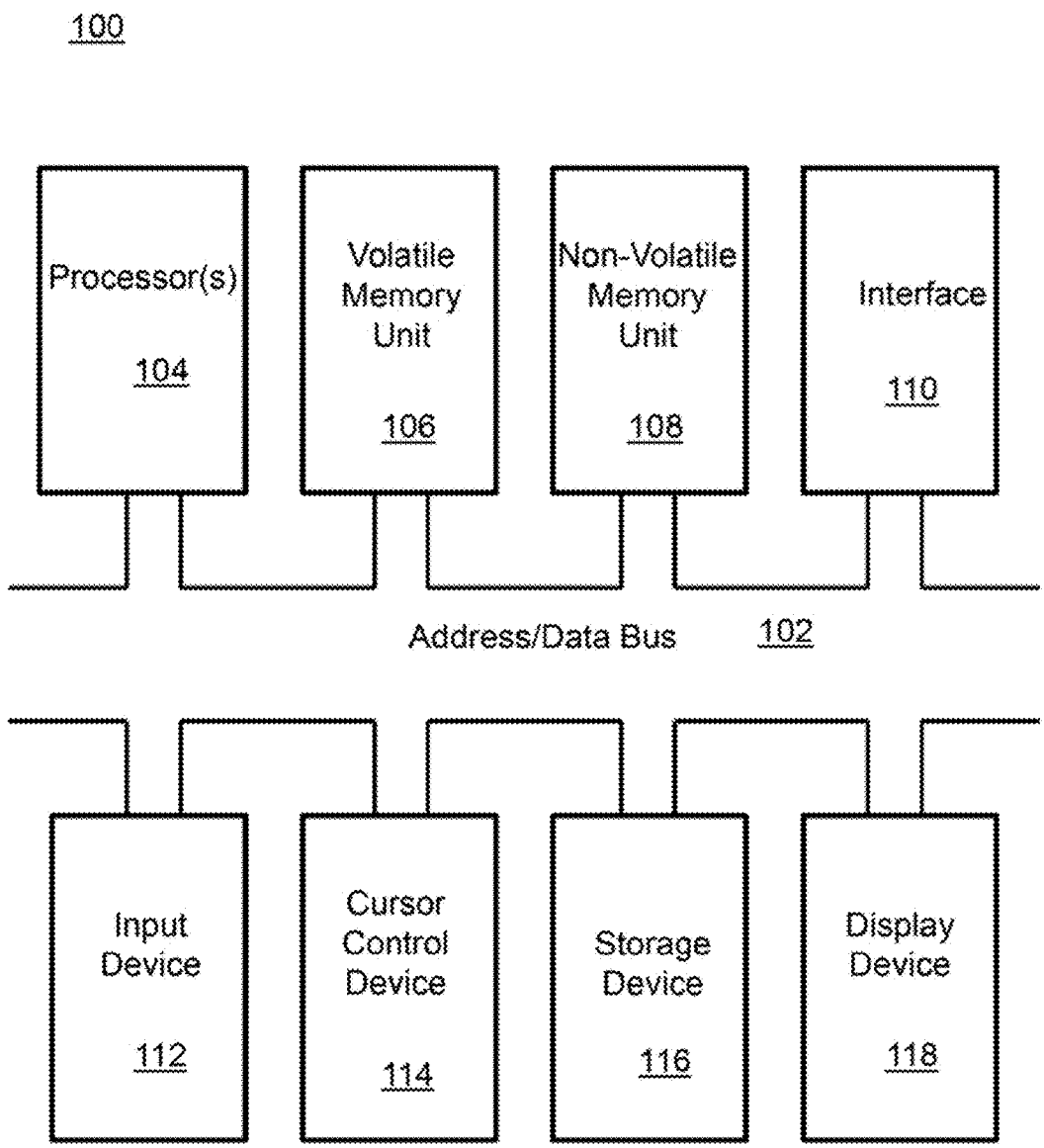
FIG. 1 is a block diagram depicting the components of cognitive blind source separator (CBSS) according to various embodiments of the present invention.

The present invention is related to a blind source separator and, more particularly, to a blind source separator that is operable for separating multiple temporally correlated source radio-frequency (RF) signals over an ultra-wide bandwidth (e.g., >30 gigahertz (Ghz)). The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. S. Choi, A. Cichocki, H.-M. Park, and S.-Y. Lee, "Blind Source Separation and Independent Component Analysis: A Review," Neural Information Processing—Letters, Vol. 6, No. 1, January 2005.
2. A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
3. A. Hyvarinen, "Complexity Pursuit: Separating Interesting Components from Time Series," Neural Computation, Vol. 13, No. 4, pp. 883-898, April 2001.
4. Igel, C. and Husken, M., "Improving the Rprop learning algorithm", in Proc. of the $2^{nd}$ Int. Symposium on Neural Computation (NC'2000), pp. 115-121, ICSC Academic Press, 2000.

5. R. H. Walden, "Analog-to-digital converter survey and analysis," IEEE J. Sel. Areas Commun., vol. 51, pp. 539-548, 1999.

(2) PRINCIPAL ASPECTS

Various embodiments of the invention include three "principal" aspects. The first is cognitive blind source separator system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
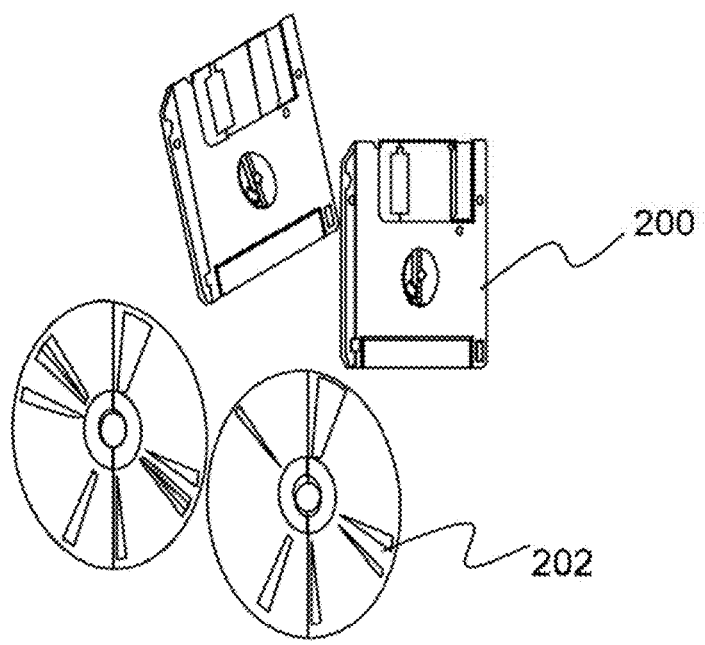
FIG. 2 is an illustration of a computer program product embodying an aspect of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

In the Blind Source Separation (BSS) problem, any single antenna measures multiple source signals. There may be more than one antenna measuring the signals, but in general each antenna "sees" all of the source signals and creates a different linear mixture of them. The task is then to use the measured mixture signals in order to recover the original source signals. The case of a single antenna operating in isolation is especially challenging because there is no sense of spatial resolution to aid in the extraction process.

The system as described herein is a cognitive-inspired method of blind source separation (BSS) that is referred to as the Cognitive Blind Source Separator (CBSS). It is designed to address the BSS problem, in which many different signals are linearly mixed by one or more antennas, and the objective is to extract the original source signals from the mixture(s) by imposing some limited constraints on the attributes of the extracted signals. Common constraints include complexity, linear predictability, and non-gaussianity.

The CBSS includes three primary components. The first component is a delay embedding module. The mixture signals that form the input to the CBSS are continuously passed through the delay embedding module, which creates delay embedded mixture signals. The delay embedded mixture signals are a finite temporal record of the values of the mixture signals. The next component is a reservoir, which is the cognitive-inspired aspect of the system. The reservoir accepts the delay-embedded mixture signals as input. The reservoir maps this input to a high-dimensional dynamical system. The reservoir has a predefined number of outputs, which are generated by continually mapping the reservoir states through a set of distinct linear functions with one such function defined per output. The next component is a bank of adaptable finite impulse response (FIR) filters. Each output time-series generated by the reservoir is fed into a unique filter with an adaptable center frequency. The filter bandwidths are set in advance and do not change. The outputs from the adaptable filters are the original source signals and represent the final output of the CBSS.

Some embodiments of the CBSS include one or more of several unique aspects. First, the CBSS may combine the benefits of delay embedding and reservoir computing into a single architecture in order to create a high quality basis of representation for the incoming signals. Second, the CBSS may combine methods from FIR filter theory with machine learning in order to achieve robust signal extraction using the signal representation generated by the reservoir. In particular, the CBSS may utilize filters with unimodal frequency responses and adapts their center frequencies using a combination of gradient-descent and gradient-free optimization. Third, the adaptation scheme employed by some embodiments of the CBSS incorporates an explicit mechanism that limits how close different filters can approach one another in the frequency domain, which is used to ensure that each filter extracts a unique signal. Fourth, the CBSS may employ a unique method to determine when a particular filter is in the process of extracting a source signal. This technique treats the variance of a filter's center frequency as an indicator of convergence on a source signal. Fifth, the CBSS may be the first system to employ a reservoir for blind source separation.

Some embodiments of the CBSS system of this disclosure exhibits one or more of several advantages in challenging BSS scenarios relative to current state-of-the-art methods. First, because some embodiments of the CBSS system perform adaptive filtering, its hardware-based embodiment requires much less weight and power than current brute-force channelization methods. Second, some embodiments can cover an ultra-wide bandwidth of over 30 GHz and yet still exhibit very low latencies on the order of 0.1 nanoseconds. Third, some embodiments can simultaneously extract large numbers of noisy source signals that have been linearly mixed by a single antenna. That is, in order to be effective, the cognitive BSS system does not require a multi-antenna array, which is needed by many other methods for BSS. Fourth, the cognitive BSS system may be capable of extracting signals in real-time using a constraint that covers a wide range of electromagnetic and acoustic signals of interest. Many other current approaches use powerful, but computationally expensive constraints, such as signal complexity measures, or rely on loose constraints, which may be computationally inexpensive but have limited capacity to capture the structure of real-world source signals. In contrast, some embodiments of the cognitive BSS system as described herein utilize the constraint that a source signal is adequately described by a single tone over any short interval of time, which can be computed quickly with limited computational cost.

As can be appreciated by those skilled in the art and given the improvements provided by the CBSS as described herein, the CBSS can be implemented in a variety of systems and applications. For example, the CBSS can be implemented with Electronic Support Measures (ESM) receivers (such as those developed by Argon ST) and other systems on airborne platforms (such as AWACS, F/18G). The CBSS can be implemented, for example, in ESM systems that can perform real-time processing of signals over an ultra-wide bandwidth (>30 Ghz). In such applications, fast detection of source signals is very important for gaining real-time situational awareness and response. The CBSS approach described in this disclosure is also applicable to vehicle applications, such as rapid detection and separation of obstacles from clutter from radar antenna signals. Another example is the typical BSS scenario of separating multiple speech signals in a cluttered environment (e.g., a cocktail party), because all of the speech signals occupy roughly the same frequency bandwidth.

(4) SPECIFIC DETAILS OF VARIOUS EMBODIMENTS

Described is a cognitive blind source separator (CBSS) that is operable for separating multiple temporally correlated source radio-frequency (RF) signals. Some embodiments of the CBSS assume that the source signals each occupy a narrow frequency bandwidth, and while the signals can overlap temporally, it is assumed that they only can overlap simultaneously in time and frequency only very rarely. Non-limiting examples of such source signals include the radio-frequency (RF) signals used for radar and ultrasonic acoustic pulses used for sonar, or audio signals as used in separating multiple speech signals.

Figure 3:
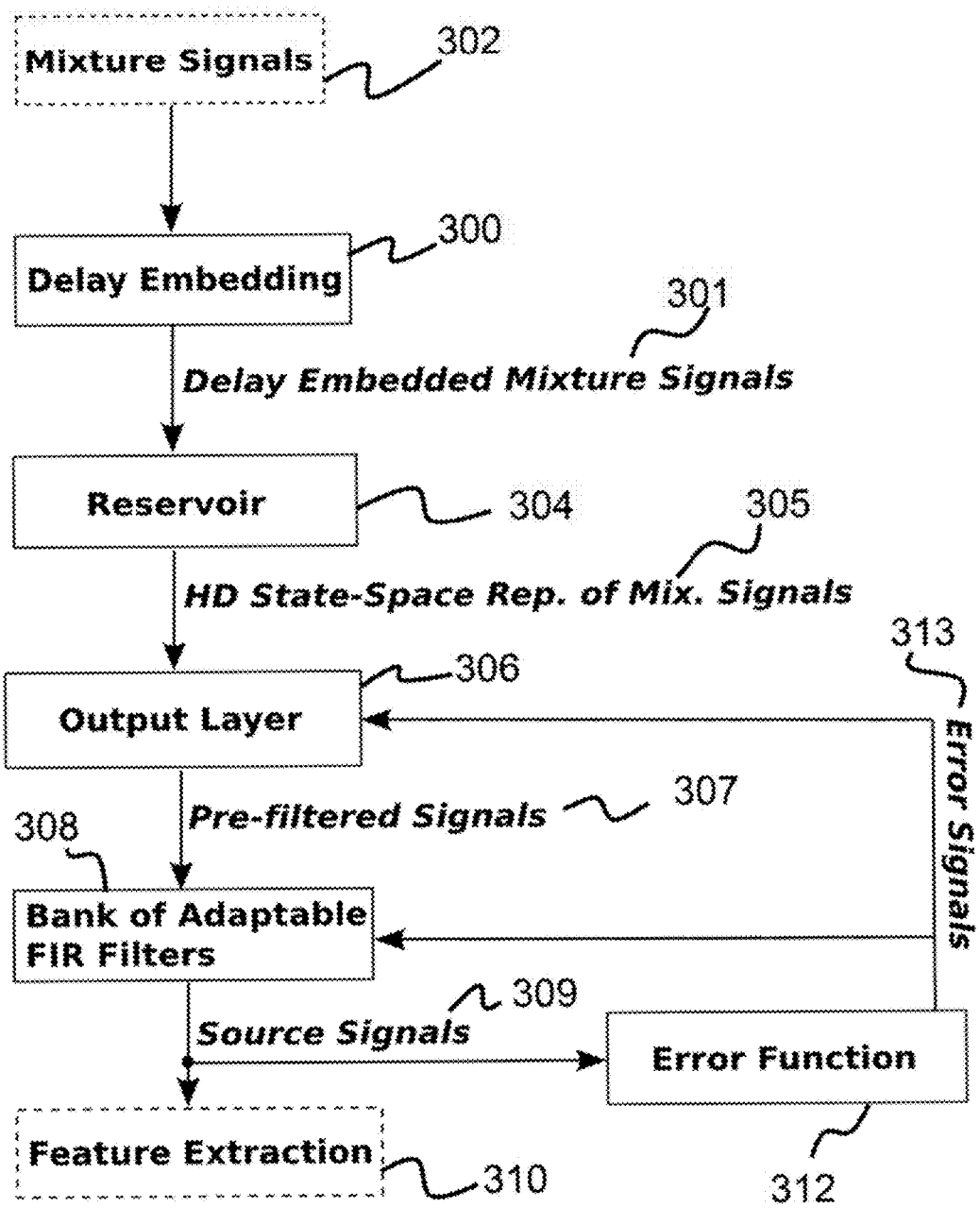
FIG. 3 is a flowchart illustrating components and interactions of the CBSS according to various embodiments.

A systematic representation of the CBSS is shown in FIG. 3, which depicts components of the CBSS and their interactions. The input to the invention is a time-series of data points (mixture signals 302) that are samples from one or more mixtures of source signals to be extracted. For example, the source signals could be radar pulses and the mixture signals 302 would be antenna measurements. The time-series is fed through a delay embedding module 300 that creates a time-lagged version of the input signal (i.e., a delay embedded mixture signal 301). The delay embedding module 300 stores a finite number of past signal values, thus turning the scalar-valued mixtures into multi-dimensional signals. The delay embedded mixture signal 301 is mapped into the reservoir 304 via linear functions. Thus, the delay embedded mixture signals 301 are linearly mapped into the reservoir 304, which in this non-limiting example, is embodied by a recurrent neural network. The reservoir 304 is a dynamical system and the combination of the reservoir states and delay embedded mixture signal 301 creates a high-dimensional state-space representation 305 of the original mixture signals. For example, particular neurons in the reservoir may represent specific source signals.

The state-space representation 305 is mapped to a fixed number of output nodes (in an output layer 306) by different linear combinations of the reservoir's 304 state in order to generate the pre-filtered signals 307. There is a unique linear function for each output node in the output layer 306. Thus, the reservoir state-space representation of the mixture signals 302 is linearly mapped into the output layer 306. Note that the terms "linear combinations" and "linear function" are used synonymously herein. The different linear functions are learned, for example, the same way that the filter center frequencies are in order to minimize the error function. For example, the system obtains derivative of the error function with respect to the weights of the different linear functions and adapts the weights along with the filter center frequencies.

Each output node is associated with a unique finite impulse response (FIR) filter (in a bank of adaptable FIR filters 308) and the pre-filtered signals 307 are passed through their respective filters (in the bank of adaptable FIR filters 308) in order to identify (extract) the source signals 309 that were originally mixed together. Thus, the outputs from the adaptable FIR filters 308 are the original source signals and represent the final output of the CBSS. Features, such as pulse descriptor words (PDWs), may then be extracted from the separated source signals using an applicable feature extraction module 310. In various other embodiments, the system generates the source signals or signal data (as opposed to identifying/extracting the source signals) and/or stores the separated source signals or signal data.

The output from the bank of FIR filters 308 is also passed into an error function module 312 from which an error signal 313 is derived. The error signal 313 is used to update the center frequencies of the filters (in the bank of FIR filters 308) and the weights in the linear combinations associated with the output nodes (in the output layer 306) to achieve the cleanest possible extraction. This adaptation leads to the filters separating the source signals. These aspects are described in further detail below.

(4.1) Delay Embedding

As noted above, the mixture signals 302 that form the input to the CBSS are continuously passed through the delay embedding module 300, which creates delay embedded mixture signals 301. The delay embedding is the first step in capturing the dynamics of the different source signals that reside within the mixture signals 302.

Figure 4:
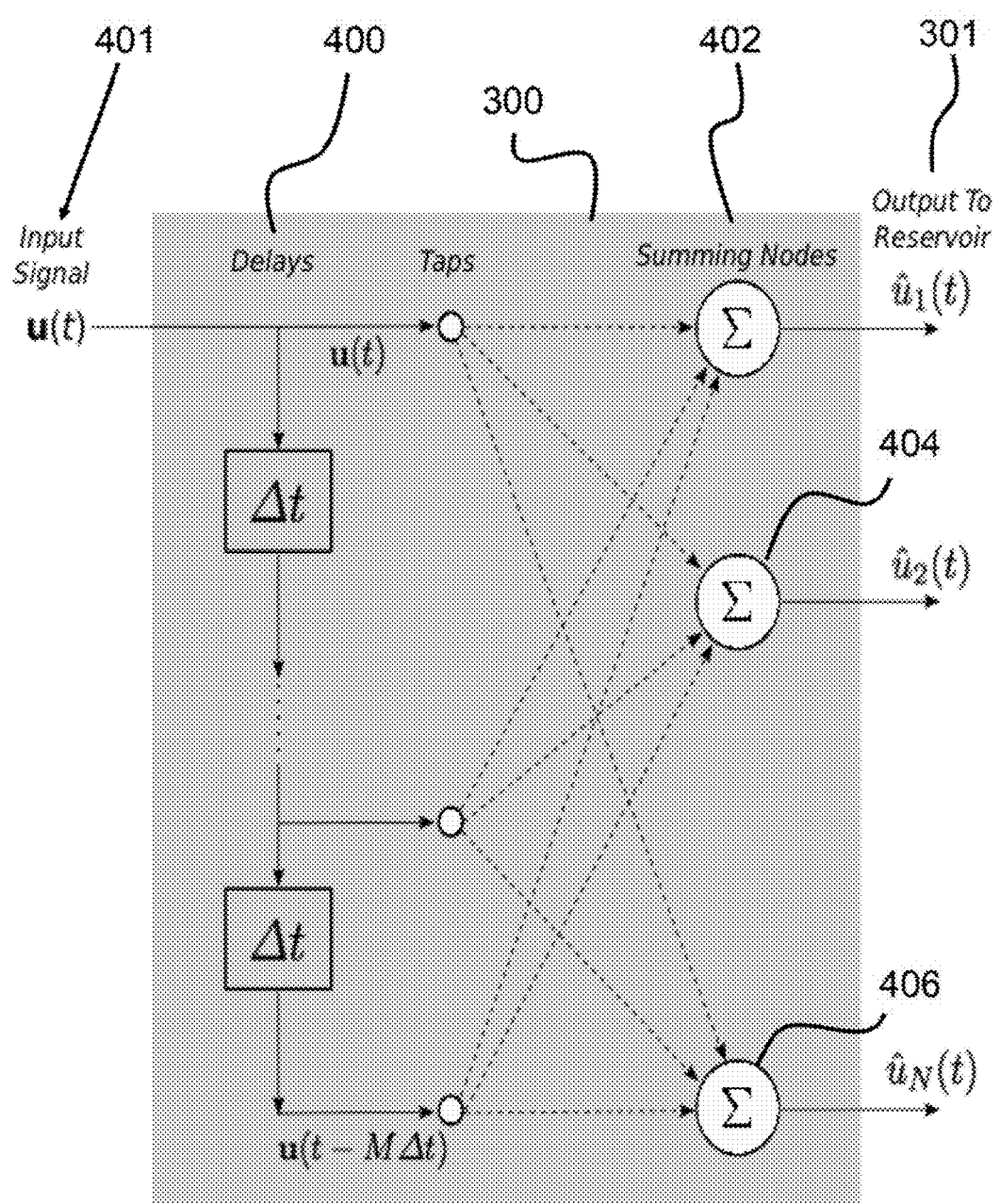
FIG. 4 is a schematic illustrating a delay embedding procedure according to various embodiments of the present invention.

A schematic of the delay embedding module 300 is shown in FIG. 4. The input signal 401 is made of the mixtures of source signals (i.e., mixture signals 302). The input signal 401 is passed through a finite series of delays 400 to create the embedding. The time-gap between delayed values is constant. The summing nodes 402 are responsible for generating the delayed embedded mixture signals 301 which is the input to the reservoir and there is exactly one such node per node in the reservoir. Each summing node 402 performs a unique linear combination of each delayed value from every mixture signal. These different linear combinations assist in amplifying source signal dynamics that lie within different frequency bands, and are thus a first step in the source signal separation process.

As noted above, the input signal u(t), which may be a vector, is made of the mixture signals 302. The finite series of delays 400 is applied to each of the mixture signals 302, thus generating a delay embedding [u(t), u(t−Δt), u(t−MΔt)]. Here, Δt is the time-gap between consecutive values in the delay-embedded representation of the input signal (i.e., the time-gap between taps) 302, and M is the total number of delays. Conceptually, one can think of each mixture single 302 as passing through its own series of delays 400 with the same values for Δt and M. There are N summing nodes 402, which is equal to the number of nodes in the reservoir. For a given summing node (e.g., 404), each delayed value of each mixture signal 302 is weighted and passed to the node 404, which then sums its inputs and produces one of N one-dimensional signals (i.e., delayed embedded mixture signals 301) passed as input to a corresponding node in the reservoir. The weights on the connections to a particular summing node (e.g., 404) are unique from the weights on the connections to other summing nodes (e.g., 406). This flexibility permits different linear combinations that are able to amplify source signal dynamics that occur within different frequency bands, thus providing a first step towards source signal separation.

(4.2) Reservoir

The reservoir is a high-dimensional dynamical system, which is implemented as a recurrent neural network in accordance with some embodiments. A purpose of the reservoir is to encode time-series data as trajectories in the high-dimensional state-space. In particular, a single point in this state-space encodes information about the history of input data flowing from the delay embedding procedure. In this way the reservoir forms a temporal memory. The delay-embedding module and reservoir work together to create a preliminary separation of the source signals from the mixture signal.

Figure 5:
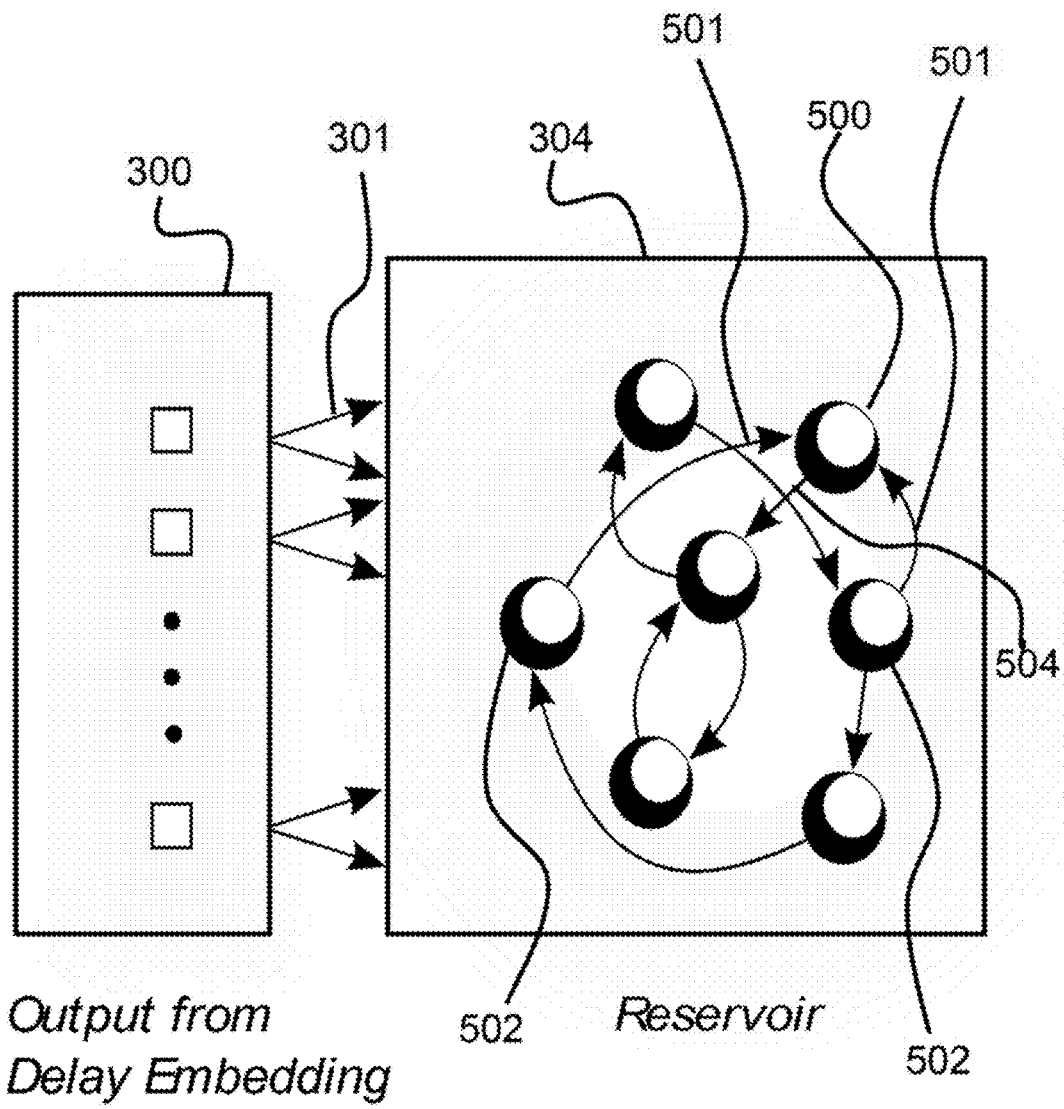
FIG. 5 is an illustration of a recurrent neural network (RNN) embodiment of a dynamic reservoir according to various embodiments of the present invention.

As shown in FIG. 5, the reservoir 304 receives input from the delay embedding module 30. The reservoir 304 comprises a group of interconnected processing nodes called neurons 500, which communicate with each other via weighted connections. The connection weights are randomly generated (e.g., from a uniform or normal distribution), with only a small percentage of them (10/% in the reduction to practice below) having nonzero values. In addition, the connection weights are normalized so that when embedded in an adjacency matrix A (i.e., $A_{ij}$ contains the connection weight from node i to node j), the spectral radius of A is less than 1. Each neuron 500 computes the weighted sum of its input, which includes the output 301 from the delay embedding module 300 as well as the output 501 from other neurons 502 in the reservoir 304. The resulting scalar input is then optionally passed through a nonlinear function (a non-limiting example of one such function is a hyperbolic tangent function) in order to generate the neuron's 500 output 504. In the reduction to practice example below, the nonlinear function is not used.

This input-output process continues over time and the resulting time-series of reservoir neuron states constitutes the points in the high-dimensional reservoir state-space that encode salient features of the source signals. In this way the reservoir provides a beneficial step in the process of extracting the source signals from the mixture signals.

(4.3) Output Layer

Figure 6:
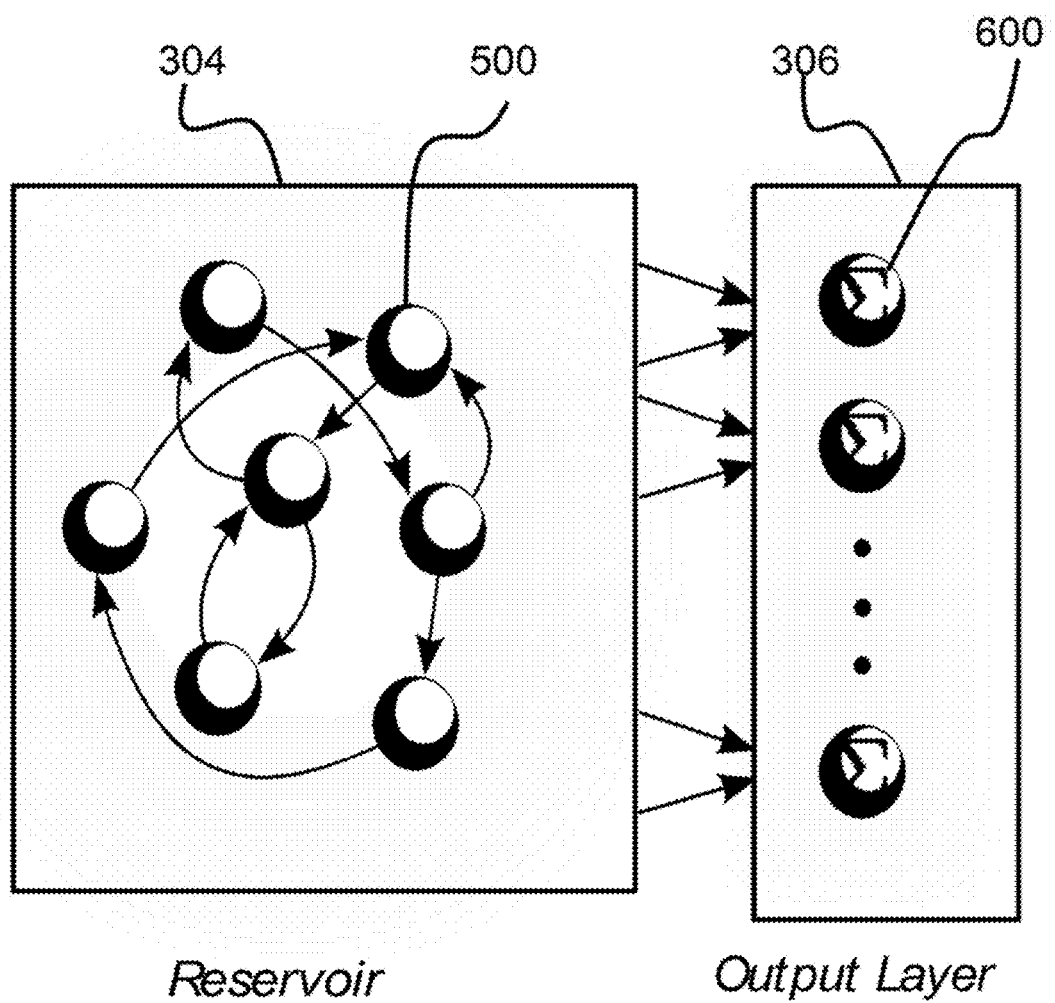
FIG. 6 is an illustration depicting an output layer of summing nodes.

As shown in FIG. 6, the output layer 306 comprises a set of summing nodes 600 in accordance with some embodiments. Each summing node 600 receives the weighted output from each reservoir 304 node 500 as input, and sums these values together to produce its output. Each node 600 in the output layer 306 has a unique and adaptable set of weights on its input connections, referred to as the output weights. As one or more mixture signals are passed into the Cognitive Blind Source Separator, these weights are adapted (as described below) so that the output from a given node 600 amplifies a subset of the source signals while suppressing others. This is the third stage in the process of separating the source signals from the mixture signal(s), with the first stage being the delay embedding representation of the mixture signal(s) and the second stage being the reservoir 304 representation.

(4.4) Bank of Adaptable FIR Filters

For some embodiments, the final stage of the Cognitive Blind Source Separator is a set of adaptable FIR filters. The only constraint on the type of filter is that it must have a unimodal gain response in the frequency domain, though ripple is acceptable. The Gaussian filter is an example of an acceptable FIR filter type. Each filter in the bank is matched with exactly one of the nodes 600 in output layer 306, which produces a set of pairs of filters and corresponding output nodes. The input to a filter is the output generated by its corresponding node 600 in the output layer 306.

The center frequency of each filter is adaptable. As a mixture signal is run through the network these parameters are adapted in such a way that the center frequency of each filter converges on the frequency of a unique source signal. In essence, the filters act as constraints on the outputs of the nodes 600 in the output layer 306, forcing them to extract a single source signal from the mixture. The frequency of a source signal may be a function of time. The CBSS only requires that a source signal be well characterized by a single frequency over any short interval of time.

(4.5) Error Function

Referring again to FIG. 3, in some embodiments, the error function 312 is a feedback component of the CBSS and is responsible for guiding the adaptation of the filter center frequencies and weights on the connections from the reservoir 304 nodes to the nodes in the output layer (output weights) 306. Conceptually, each filter and output layer node pair may be viewed as having its own error function, with all individual error functions having the same form. Specifically, the error function 312 comprises three terms that are summed together. The first term is the negative power of the corresponding filter's output. The negative power is computed as $-1/M\Sigma_{i=0}^{M-1} y(t-1)^2$, where y(t) is the output from the filter at time t and M is the number of samples used in the average. The first objective is to minimize the negative power (maximize the power), which tends to drive the filter's center frequency towards one of the source signal frequencies. The adaptation for this objective occurs on a fast time-scale in order to cover a very wide bandwidth (at least 30 GHz). The second term is the sum of squared differences between the filter's output and the output of its corresponding node in the output layer. This leads to the second objective, which is to minimize the discrepancy between the filter's input and its output. This has the effect of limiting the number of source signals in the mixture that the filter is able to "see", and thus helps focus the filter on a single source signal for extraction. The adaptation for this second objective occurs at a slower time-scale than that of the first objective. The third term, which we refer to as the penalty term, prevents filters from getting too close to one another in the frequency domain and thereby extracting the same source signal. For example, let $dw_{ij}=|w_i-w_j|$, where $w_i$ and $w_j$ are the center frequencies of filter i and filter j, respectively. The penalty term is given by $\Sigma_{j=1}^{N} G(dw_{ij})$, where G is the Gaussian distribution with mean 0 and user-specified variance, and N is the number of filters.

The output of the error function is used to generate the error signal 313. The error signal 313 is used to adapt the filter center frequencies and the weights on the connections from the reservoir 304 to the output layer 306. The error signal 313 is generated by taking the derivative of the error function 312 with respect to the output weights and filter center frequencies. These system parameters are adapted by using the derivative to perform gradient descent on the error function. Recall that one can think of each filter and output node pair as having their own error function. For each error function, basic gradient descent is used to adapt the output weights, but the CBSS utilizes a unique form of gradient descent that combines local and global search in order to adapt the filter's center frequency. This allows the CBSS to cover an ultra-wide source signal bandwidth of at least 30 GHz, while maintaining the ability to quickly hone in on and track source signals. For example and in one embodiment, the CBSS fuses Resilient Backpropagation (Rprop) (see Literature Reference No. 4) and randomized search. The Rprop component uses the sign of the derivative and an adaptive step-size to precisely track source signal frequencies. The randomized search component operates by generating a small sample of center frequencies from a Gaussian distribution on each step of the adaptation process. This allows a filter's center frequency to cover large spans of bandwidth quickly in order target a specific source signal for tracking. The center frequency proposed by Rprop and those generated by the randomized search component are evaluated under the error function using the current input sequence and current center frequencies in the penalty term. The frequency with the lowest error is chosen as the corresponding filter's next center frequency.

(4.6) Reduction to Practice

For illustrative purposes, the CBSS was demonstrated by covering results produced by a particular non-limiting example of an embodiment. The example embodiment used a delay-embedding of length M=50 and a time-gap of Δt=0.02 ns. The reservoir contained 50 leaky-integrator neurons with linear transfer functions. All system weights were randomly initialized to values in the interval [−1,1]. The output layer contained 3 linear neurons. Gaussian FIR filters were used, each with a length of 100 taps. The summation in the error function was taken over the past 100 filter outputs. The Gaussian function used in the error function was scaled by a factor 10,000 and had a variance of 0.0025. The randomized search component was implemented by drawing 4 center frequencies from a Gaussian distribution on each time-step and for each filter. Each distribution was centered at the center frequency of its respective filter and had a variance of 0.01. In the following experiments all signals were sampled at a rate of 180 GHz. The filter center frequencies were measured in units of pi-normalized angular frequency, which is related to the frequency in Hertz by the formulae $f_\pi = 2\pi f_{Hz} 1/R$, where R is the sampling rate of the measured signal and $0 \le f \le \pi$.

Figure 7:
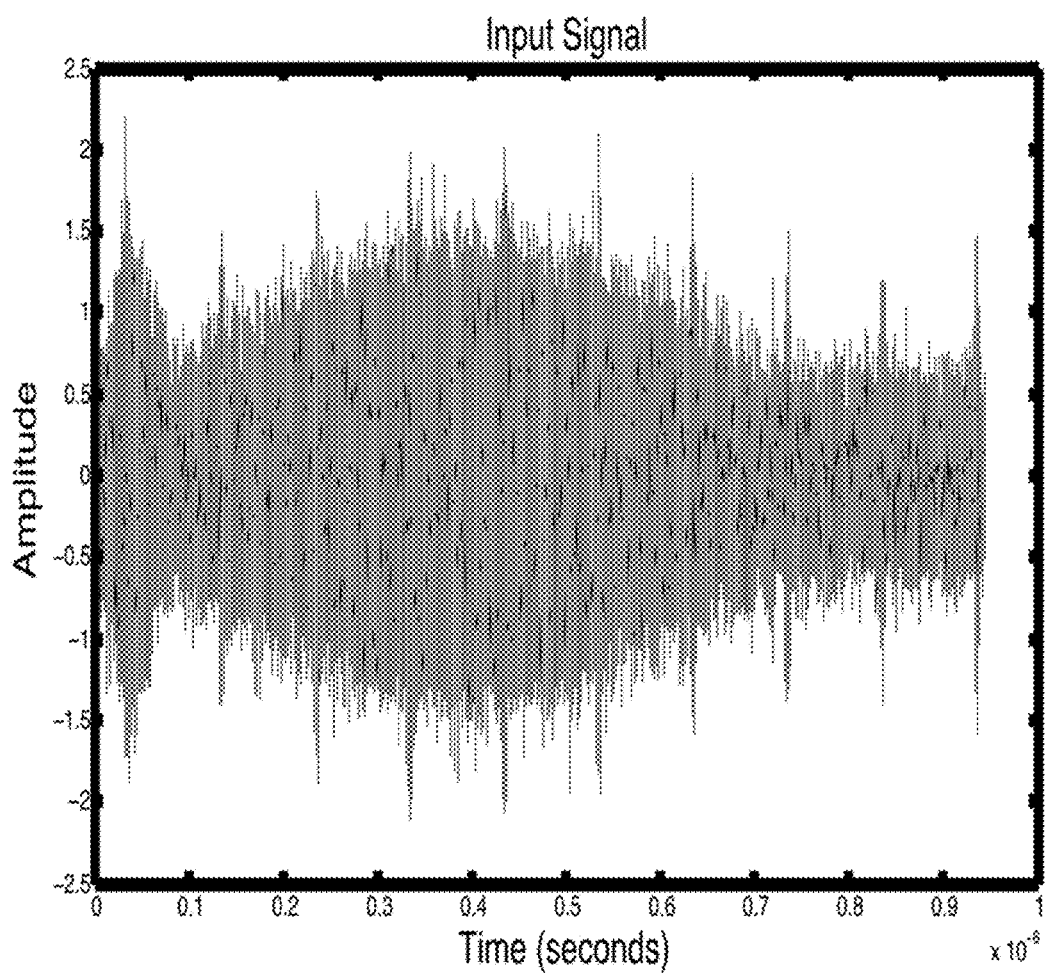
FIG. 7 is a graph illustrating a mixture signal passed as input to the CBSS, containing three, linearly mixed source signals: a medium length Barker 13 coded pulse, a long chirped pulse, and a frequency hopping signal that consists of many short pulses.

In order to test the effectiveness of the CBSS, a realistic mixture signal was created that consisted of three different source signals: a Barker 13 coded pulse at 3 GHz, a chirped pulse from 2.0 GHz to 2.5 GHz, and a frequency hopping signal consisting of 10 ns pulses between 9 GHz and 11 GHz. These three source signals were linearly mixed to produce the mixture signal shown in FIG. 7, which has a 12 dB signal-to-noise ratio.

Figure 8:
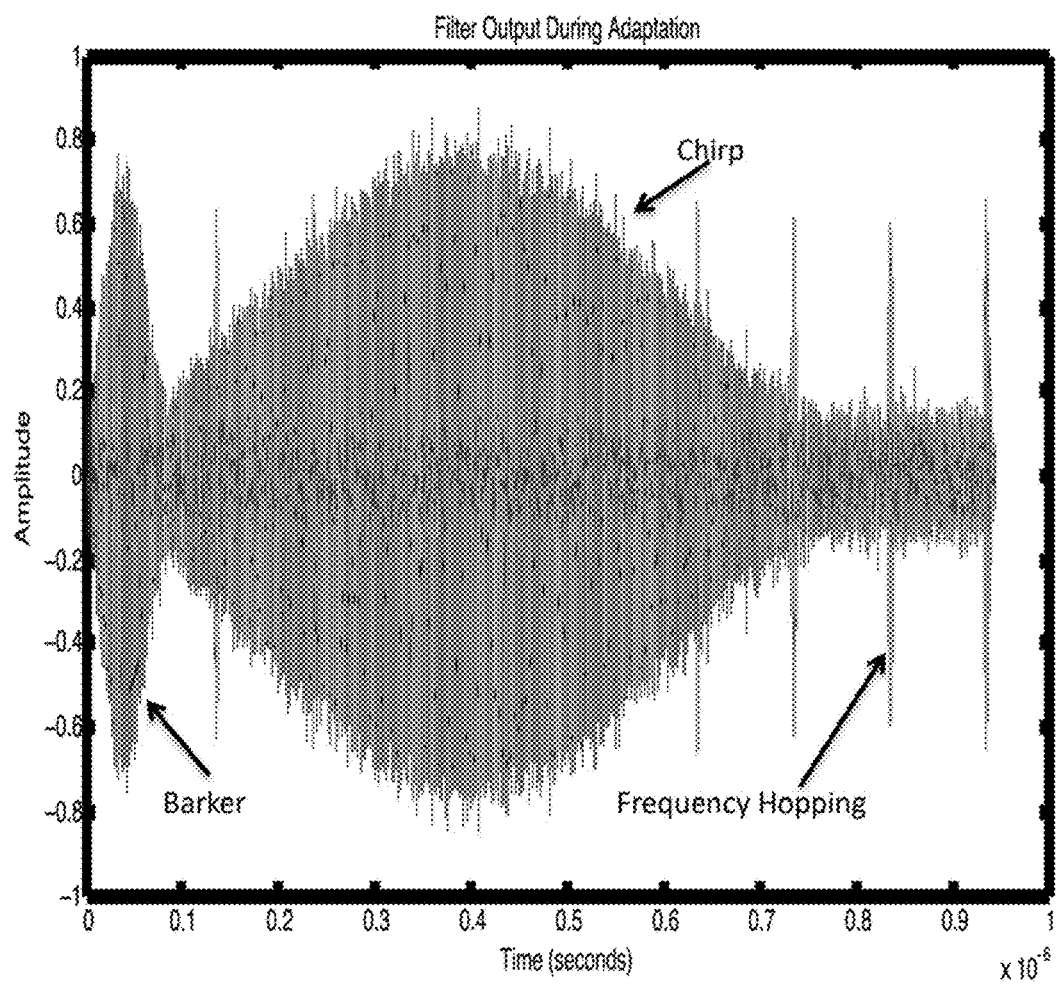
FIG. 8 is a graph illustrating the source signals as extracted by the CBSS.

The mixture signal was passed as input to the CBSS and the resulting extracted source signals are shown in FIG. 8. The outputs of the three filters are shown in blue, green, and red. The "blue" filter extracted the 3 GHz Barker 13 coded pulse (the first pulse), and then extracted the 2.0-2.5 GHz chirped pulse (the second pulse). The "green" filter extracted all of the pulses in the frequency hopping signal. The "red" filter did not extract any pulses because the other filters begin tracking them first. Of central importance is that all of the pulses have been extracted and none of the pulses are split between multiple filters.

Figure 9:
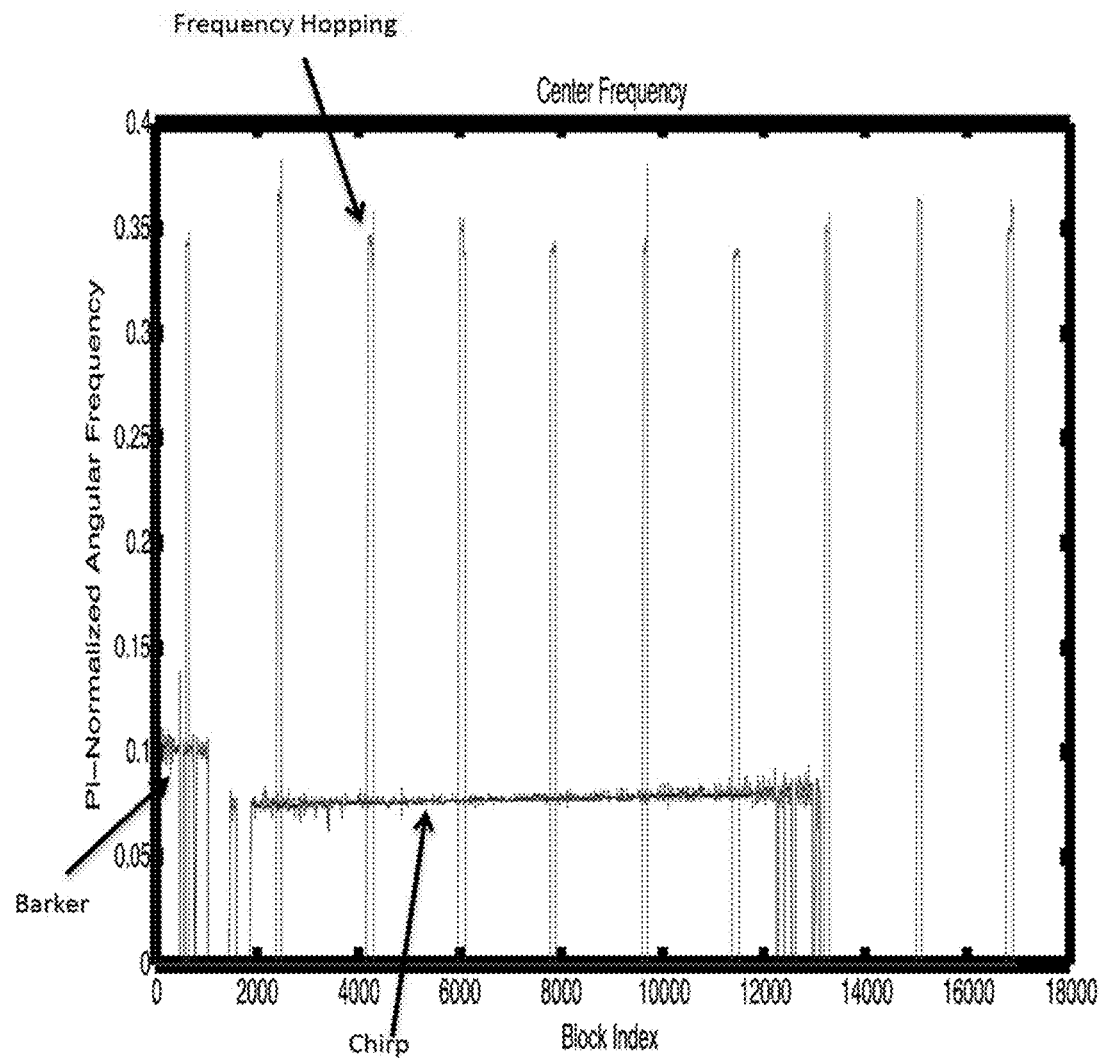
FIG. 9 is a graph illustrating a center frequency of each filter while the mixture signal is input to the CBSS.

The frequency tracking behavior of the CBSS can be seen clearly in FIG. 9, which shows the center frequency of each filter (blue, green, and red) over the duration of the input signal. In this illustration it is clearly seen that the blue filter tracks the Barker pulse at $f_\pi = 0.10$ and the chirped pulse from $f_\pi = 0.07$ to $f_\pi = 0.09$. The green filter tracks the frequency hopping signal with pulses around $f_\pi = 0.35 = 10$ GHz. The red filter is displayed as having a center frequency of 0 throughout the duration of input because it does not track any of the source signals. When a filter is not tracking a signal its center frequency is shown as 0 for visualization/analysis purposes. The presence or absence of a signal with respect to a given filter is determined by thresholding the normalized negative power of the filter. The normalized negative power is given by $-[1/M \Sigma_{i=0}^{M-1} y(t-1)^2]/\text{var}(x(t))$, where y(t) is the output from the filter at time t, M is the number of samples used in the average, x(t) is the input to the filter, and var(x(t)) is the variance in the input computed over the same M samples. In the presence of signal the value of this measure will drop below a pre-defined threshold. The threshold is determined by observing the value under pure noise.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. For example, while modules may be referenced, the modules can be incorporated into a single machine or component separate machines or components. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A cognitive blind source separator (CBSS), the CBSS comprising:
    one or more processors and a memory, the memory being a non-transitory computer-readable medium having executable instructions encoded thereon, such that upon execution of the instructions, the one or more processors perform operations of:
        receiving a mixture signal, the mixture signal being a time-series of data points from one or more mixtures of source signals;
        generating a delay embedded mixture signal based on the mixture signal;
        linearly mapping the delay embedded mixture signal into a reservoir;
        creating a high-dimensional state-space representation of the mixture signal by combining the delay embedded mixture signal with reservoir states;
        identifying at least one of the separate source signals that collectively form the mixture signal based on the high-dimensional state-space representation of the mixture signal; and
        linearly mapping the state-space representations to one or more output nodes in an output layer to generate ore-filtered signals, wherein each node in the output layer has a unique and adaptable set of output weights on its input connections, such that as one or more mixture signals are passed into the CBSS, the output weights are adapted so that output from a given node amplifies a subset of the source signals while suppressing others.

2. The cognitive blind source separator as set forth in claim 1, wherein at least one of the separate source signals is identified by adaptively filtering the pre-filtered signals.

3. The cognitive blind source separator as set forth in claim 2, wherein in adaptively filtering, the pre-filtered signals are passed through a bank of adaptable finite impulse response (FIR) filters.

4. The cognitive blind source separator as set forth in claim 3, wherein each pre-filtered signal is fed into a unique filter in the bank of adaptable FIR filters, with each unique filter having an adaptable center frequency.

5. The cognitive blind source separator as set forth in claim 4, wherein the output layer comprises a set of summing nodes, each summing node receiving a weighted output from each reservoir node as input, and summing these values together to produce its output.

6. The cognitive blind source separator as set forth in claim 5, further comprising an operation of deriving an error signal, with the error signal being used to update the center frequencies of the filters in the bank of adaptable FIR filters and update the output weights in the output layer.

7. The cognitive blind source separator as set forth in claim 6, wherein each output node in the output layer of the reservoir is associated with a unique FIR filter and the pre-filtered signals are passed through their respective FIR filter.

8. The cognitive blind source separator as set forth in claim 7, further comprising an operation of extracting features from at least one of the separate source signals.

9. The cognitive blind source separator as set forth in claim 8, wherein the reservoir is a recurrent neural network with a plurality of nodes.

10. The cognitive blind source separator as set forth in claim 1, further comprising an operation of extracting features from at least one of the separate source signals.

11. The cognitive blind source separator as set forth in claim 1, wherein the reservoir is a recurrent neural network with a plurality of nodes.

12. A cognitive blind source separator (CBSS), the CBSS comprising:
   a delay embedder for receiving a mixture signal and generating a delay embedded mixture signal, the mixture signal being a time-series of data points from one or more mixtures of source signals;
   a reservoir, the reservoir adapted to linearly map the delay embedded mixture signal into the reservoir to create a high-dimensional state-space representation of the mixture signal;
   an output layer, the output layer adapted to generate pre-filtered signals by linearly mapping the state-space representations to one or more output nodes in the output layer, wherein each node in the output layer has a unique and adaptable set of output weights on its input connections, such that as one or more mixture signals are passed into the CBSS, the output weights are adapted so that output from a given node amplifies a subset of the source signals while suppressing others; and
   a bank of adaptable finite impulse response (FIR) filters, the bank of FIR filters adapted to generate separate source signals that collectively form the mixture signal by processing the pre-filtered signals through the bank of adaptable FIR filters.

13. A computer program product for generating separate source signals from a mixture signal using a cognitive blind source separator (CBSS), the computer program product comprising:
   a non-transitory computer-readable medium having executable instructions encoded thereon, such that upon execution of the instructions by one or more processors, the one or more processors perform operations of:
      receiving a mixture signal, the mixture signal being a time-series of data points from one or more mixtures of source signals;
      generating a delay embedded mixture signal based on the mixture signal;
      linearly mapping the delay embedded mixture signal into a reservoir;
      creating a high-dimensional state-space representation of the mixture signal by combining the delay embedded mixture signal with reservoir states;
      identifying at least one of the separate source signals that collectively form the mixture signal based on the high-dimensional state-space representation of the mixture signal; and
      linearly mapping the state-space representations to one or more output nodes in an output layer to generate ore-filtered signals, wherein each node in the output layer has a unique and adaptable set of output weights on its input connections, such that as one or more mixture signals are passed into the CBSS, the output weights are adapted so that output from a given node amplifies a subset of the source signals while suppressing others.

14. The computer program product as set forth in claim 13, wherein at least one of the separate source signals is identified by adaptively filtering the pre-filtered signals.

15. The computer program product as set forth in claim 14, wherein in adaptively filtering, the pre-filtered signals are passed through a bank of adaptable finite impulse response (FIR) filters.

16. The computer program product as set forth in claim 15, wherein each pre-filtered signal is fed into a unique filter in the bank of adaptable FIR filters, with each unique filter having an adaptable center frequency.

17. A method for generating separate source signals from a mixture signal using a cognitive blind source separator (CBSS), the method comprising an act of:
   causing one or more processors to execute instructions encoded on a non-transitory computer-readable medium, such that upon execution, the one or more processors perform operations of:
      receiving a mixture signal, the mixture signal being a time-series of data points from one or more mixtures of source signals;
      generating a delay embedded mixture signal based on the mixture signal;
      linearly mapping the delay embedded mixture signal into a reservoir;
      creating a high-dimensional state-space representation of the mixture signal by combining the delay embedded mixture signal with reservoir states;
      identifying at least one of the separate source signals that collectively form the mixture signal based on the high-dimensional state-space representation of the mixture signal; and
      linearly mapping the state-space representations to one or more output nodes in an output layer to generate ore-filtered signals, wherein each node in the output layer has a unique and adaptable set of output weights on its input connections, such that as one or more mixture signals are passed into the CBSS, the output weights are adapted so that output from a given node amplifies a subset of the source signals while suppressing others.

18. The method as set forth in claim 17, wherein at least one of the separate source signals is identified by adaptively filtering the pre-filtered signals.

19. The method as set forth in claim 18, wherein in adaptively filtering, the pre-filtered signals are passed through a bank of adaptable finite impulse response (FIR) filters.

20. The method as set forth in claim 19, wherein each pre-filtered signal is fed into a unique filter in the bank of adaptable FIR filters, with each unique filter having an adaptable center frequency.

* * * * *